US012744807B2

(12) United States Patent
Viswambharan et al.

(10) Patent No.: US 12,744,807 B2
(45) Date of Patent: Sep. 22, 2026

(54) NETWORK CONTROLLER POLICY ENFORCEMENT IN ENTERPRISE NETWORKS

(71) Applicant: Cisco Technology, Inc., San Jose, CA (US)

(72) Inventors: Rajesh Indira Viswambharan, Bangalore (IN); Vinay Saini, Bangalore (IN); Ram Mohan Ravindranath, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 18/798,056

(22) Filed: Aug. 8, 2024

(65) Prior Publication Data

US 2026/0046300 A1 Feb. 12, 2026

(51) Int. Cl.
*H04L 9/40* (2022.01)

(52) U.S. Cl.
CPC .......... *H04L 63/1433* (2013.01); *H04L 63/20* (2013.01)

(58) Field of Classification Search
CPC ............................ H04L 63/1433; H04L 63/20
USPC ............................................................ 726/1
See application file for complete search history.

(56) References Cited

U.S. PATENT DOCUMENTS 10,044,746 B2 * 8/2018 Vallone ............... H04L 41/0823
11,809,575 B1 11/2023 Reddy et al.
2004/0064726 A1 * 4/2004 Girouard ............... G06F 21/577 726/25
2016/0359878 A1 * 12/2016 Prasad .................... H04L 41/16
2017/0339188 A1 * 11/2017 Jain ..................... H04L 63/0428
2018/0343278 A1 * 11/2018 Vallone ................. H04L 41/046
2023/0418949 A1 12/2023 Stocks et al.
2024/0022609 A1 1/2024 Smith et al.
2024/0028724 A1 1/2024 Parla et al.
2024/0121262 A1 * 4/2024 Gill ..................... H04L 63/0263
2024/0176891 A1 * 5/2024 Hendela .............. G06F 11/3604
2024/0289745 A1 * 8/2024 Larkin .................. G06F 21/572
2024/0303172 A1 * 9/2024 Larkin ................ G06F 11/3072
2025/0030719 A1 * 1/2025 Das ..................... H04L 63/1433
2025/0103721 A1 * 3/2025 Singh ........................ G06F 8/60
2025/0117482 A1 * 4/2025 Bazalgette .............. H04L 63/20
2025/0267171 A1 * 8/2025 Sharma ................... H04L 41/16
2025/0272713 A1 * 8/2025 Hu ..................... G06Q 30/0246
2025/0378121 A1 * 12/2025 Khoury ............ G06F 16/24578

OTHER PUBLICATIONS

Yamin, et al. "Applications of LLMs for Generating Cyber Security Exercise Scenarios," Norwegian University of Science and Technology (NTNU), Feb. 26, 2024, 18 pages.

* cited by examiner

*Primary Examiner* — Taghi T Arani
(74) *Attorney, Agent, or Firm* — Lee & Hayes, P.C.

(57) ABSTRACT

The techniques described herein enable a network controller to create multi-faceted policies. The network controller may comprise a VEX processing engine that captures VEX data and generates vulnerability insights, a retrieval augmented generation (RAG) component that can be utilized to generate context data based on the VEX data, vulnerability insights, and data captured by the network controller. The network controller may implement or input the context data to a model, which outputs customized synthetic test(s). The network controller identify, generate, or modify network policies and/or network control policies based on the output from executing the synthetic tests.

20 Claims, 6 Drawing Sheets

PROCESSOR(S) 202

NETWORK INTERFACE(S) 204

MEMORY 206

NETWORK SERVICE FUNCTIONS 208

NETWORK ORCHESTRATION FUNCTIONS 210

SERVICE MANAGEMENT FUNCTIONS 212

APPLICATION PROGRAMMING INTERFACES (APIS) 214

VULNERABILITY ENGINE 110

INVENTORY COMPONENT 112

RAG COMPONENT 114

MODEL COMPONENT 116

POLICY COMPONENT 118

DATA STORE 216

COMMUNICATION LIBRARIES 218

NETWORK TOPOLOGY 220

POLICIES 222

DATA 224

NETWORK CONTROLLER 104

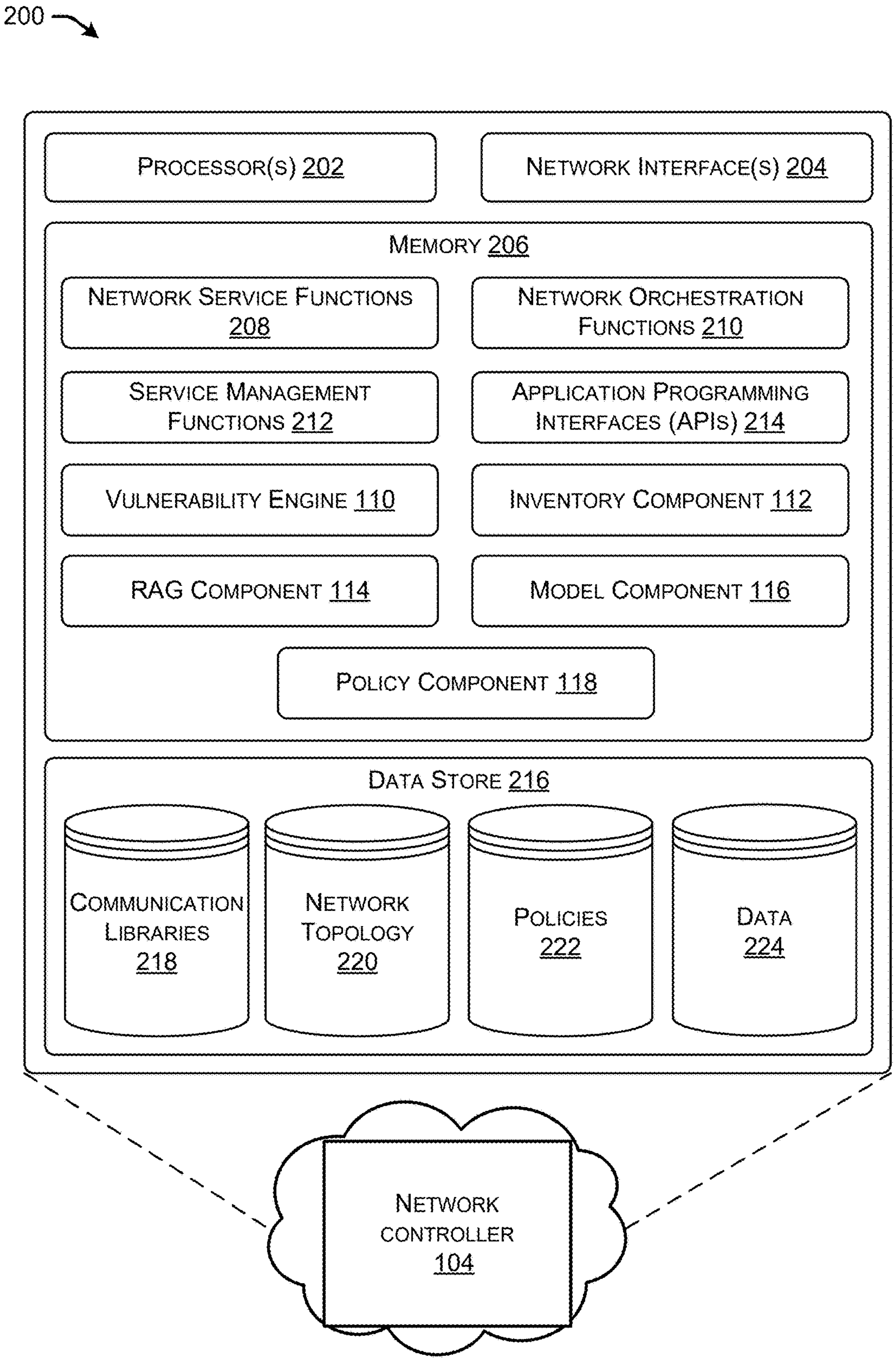

FIG. 2

NETWORK CONTROLLER POLICY ENFORCEMENT IN ENTERPRISE NETWORKS

TECHNICAL FIELD

The present disclosure relates generally to the field of computer networking, and more particularly to network controller policy enforcement within an enterprise network using software bill of material (SBOM) and vulnerability exploitability exchange (VEX) intelligence

BACKGROUND

In enterprise environments, network controllers play a crucial role in managing the security posture of network devices and applications. While these network controllers excel in proactive threat detection and mitigation, they often struggle to identify and address vulnerabilities preemptively due to limited visibility into the software components and their potential exploitability. This limitation can leave the enterprise networks vulnerable to attacks exploiting hidden vulnerabilities, resulting in data breaches, system downtime, and compromised user privacy.

When software is deployed within the enterprise network, the Software Bill of Materials (SBOM) standard, complemented by the Vulnerability Exploitability Exchange (VEX), facilitates the exchange of vulnerability information between the network controller and network components. While VEX data helps as a blueprint for sharing the vulnerability information about a in the enterprise network, the VEX data is static, such that enforcing network policies based on the VEX data can lead to false positives.

Accordingly, there is a need for a dynamic and intelligent way of enabling a network controller to wholistically capture VEX data, network data, and network context and generate and/or determine multi-faceted policies.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a component diagram of an example controller described in FIG. 1.

DESCRIPTION OF EXAMPLE EMBODIMENTS

Overview

Figure 1:
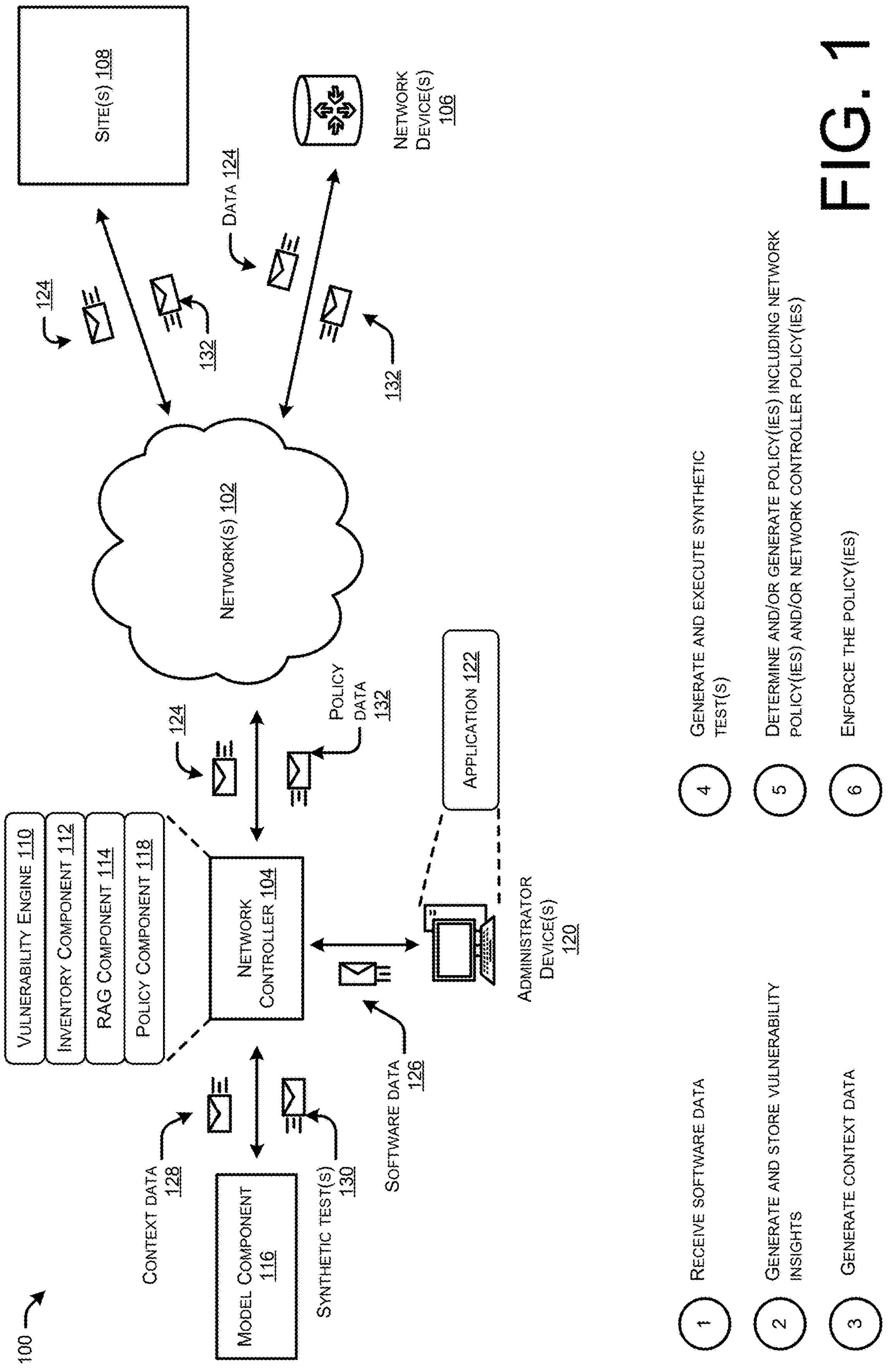
FIG. 1 illustrates a system-architecture diagram of an environment in which a system can generate multi-faceted policies using SBOM and VEX data intelligence.

The present disclosure relates generally to the field of computer networking, and more particularly to network controller policy enforcement within an enterprise network using software bill of material (SBOM) and vulnerability exploitability exchange (VEX) intelligence A method to perform the techniques described herein may be implemented by a network controller. The method may include monitoring data associated with a plurality of network devices within the network. The method may include generating, based on the monitoring, context data associated with the data. The method may also include determining that a potential vulnerability exists within the network. Additionally, the method may include generating, using the context data, a synthetic test to evaluate the potential vulnerability within the network. The method may include determining, based on executing the synthetic test, an impact of the potential vulnerability to the network. The method may also include generating, based on the impact, a network controller policy associated with mitigating the impact. The method may include enforcing the network controller policy.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

In enterprise environments, network controllers play a crucial role in managing the security posture of network devices and applications. While these network controllers excel in proactive threat detection and mitigation, they often struggle to identify and address vulnerabilities preemptively due to limited visibility into the software components and their potential exploitability. This limitation can leave the enterprise networks vulnerable to attacks exploiting hidden vulnerabilities, resulting in data breaches, system downtime, and compromised user privacy.

When software is deployed within the enterprise network, the Software Bill of Materials (SBOM) standard, complemented by the Vulnerability Exploitability Exchange (VEX), facilitates the exchange of vulnerability information between the network controller and network components. SBOM is a formal record of the components and dependencies used in building software. SBOMs can help software developers, vendors, and consumers to improve security, compliance, and transparency of the software supply chain. The SBOM can include VEX data, which includes vulnerability information (e.g., potential problems with the software and/or vulnerabilities that can be exploited, etc.) about the software. In some examples, potential vulnerabilities may include, but are not limited to one or more of the following: forming C2 (Command and control) connections and/or communicating to known C2 hosts; data exfiltration (for example, emulating DNS request and smuggling data out); accepting malicious external access (e.g., geolocation or known malicious sources); accepting out of spec calls (e.g., by referencing customer defined API specs); sending malicious traffic SPAM, phishing, scanning, recon, DDoS participation, etc.; monitoring performance and resource consumption, such as (i) if a workload consumes too much resource; (ii) keeps crashing or reloading; and (iii) generating too much log data; or any other behavior that may indicate malicious behavior.

While VEX data helps as a blueprint for sharing the vulnerability information about a in the enterprise network, the VEX data is static, such that enforcing network policies based on the VEX data can lead to false positives. For instance, when a network policy or update is pushed to the enterprise network based on the VEX data, existing techniques push the policy or update to all network devices within the enterprise network, regardless of whether the network policy or update applies to the particular site, network device, class of network devices, etc. Thus, pushing the network policy or update to all network devices can result in false positives.

Moreover, existing techniques may use the VEX data to select network policies to apply to the enterprise network. As the VEX data is static data, existing techniques fail to consider whether the potential vulnerabilities are actually causing any harm within the enterprise network. Additionally, a vulnerability or problem within the enterprise network may be better addressed by updating a policy of the network controller. However, while existing techniques focus on identifying network policies to apply based on the VEX data, there is no current mechanism to create network controller policies to change or update the network controller itself to help mitigate the vulnerability.

Accordingly, there is a need for a dynamic and intelligent way of enabling a network controller to wholistically capture VEX data, network data, and network context and generate and/or determine multi-faceted policies.

This disclosure describes techniques and mechanisms for a system to generate multi-faceted policies using SBOM and VEX data intelligence. In some examples, the system may monitor data associated with a plurality of network devices within the network. The system may generate, based on the monitoring, context data associated with the data. The system may determine that a potential vulnerability exists within the network. The system may generate, using the context data, a synthetic test to evaluate the potential vulnerability within the network. The system may determine, based on executing the synthetic test, an impact of the potential vulnerability to the network. The system may generate, based on the impact, a network controller policy associated with mitigating the impact. The system may enforce the network controller policy.

In some examples, the system may comprise a vulnerability engine. In some examples, the vulnerability engine may comprise a VEX processing engine. The vulnerability engine may be implemented as a component of the network controller. The vulnerability engine may be configured to receive SBOMs associated with software being deployed within the enterprise network. In some examples, the vulnerability engine may comprise one or more parsers for VEX. For instance, the vulnerability engine may be designed to support a first parser based on the CycloneDX standard and a second parser based on the SPDX standard. Accordingly, the vulnerability engine may be configured to process the SBOM and/or VEX data based on the two different standards. For instance, the vulnerability engine may be designed to extract VEX data from SBOMs associated with underlying devices or applications. The vulnerability engine may generate, based on parsing the VEX data, vulnerability insights in terms of which components of the enterprise network are vulnerable, where these are these hosted etc. As an example, the vulnerability insights may identify a specific component within the network that is associated with a particular vulnerability identified in the VEX data of the software, as well as where in the enterprise network the component is located, what class of device the component is hosted on, etc. Accordingly, the vulnerability engine may process the VEX data based on two different standards. In some examples, the vulnerability engine may create an inventory (e.g., the inventory component), which may be stored in memory of the network controller and/or a database of the network controller. In some examples, the vulnerability engine may be configured to communicate with one or more additional components of the network controller.

In some examples, the system may comprise an inventory component. In some examples, the inventory component may correspond to a knowledge base of the network controller. In some examples, the inventory component may comprise an inventory created by the vulnerability engine. In some examples, the inventory component may additionally or alternatively comprise data captured by the network controller. For instance, the data may include device inventory data, telemetry data, incident data, processed data, provision failure history, log data, configuration of devices within the enterprise network, data exported from applications, user data associated with user(s) accessing device(s) or application(s), etc. associated with network devices, applications, and/or any other devices associated with the enterprise network. Accordingly, the inventory component may store VEX inventory data, as well as other data, that is organized and indexed for efficient retrieval.

In some examples, the vulnerability engine may be configured to communicate with the inventory component to create the VEX inventory and/or store or retrieve data. In some examples, the inventory component may be configured to communicate with one or more additional components or engines of the network controller.

In some examples, the system may comprise a retrieval augmentation generation (RAG) component. In some examples, RAG is an approach used to create augmented context. The augmented context may then be input into a model (e.g., such as a large language model (LLM) or other machine learning mechanism) in order to provide outputs that are more customized and accurate. In some examples, the RAG component is implemented as a component of the network controller. The RAG component may be configured to access the VEX data, VEX inventory, and data stored in the inventory component. The RAG component may process the VEX data, VEX inventory, and/or data and generate context data. For instance, the context data may be based on a state of the enterprise network and/or the vulnerability insights. In some examples, the RAG component may queries the retrieve the operation history, logs, events, telemetry insights, failed information, etc., associated with the network that is stored in the inventory component. The RAG component may use this data to generate rich context data that comprises sufficient background to enable a model component of the network controller to generate customized synthetic test(s).

In some examples, the RAG component may generate the context data in response to receiving a query from the vulnerability engine. For instance, the query may be sent by the vulnerability engine periodically (e.g., every hour, day, week, or any other suitable time period). The time period may be preset by a network administrator. In some examples, the RAG component may access and/or collect data from the inventory component and generate the context data. In some examples, the context data may indicate a current state of the enterprise network and/or a potential vulnerability within the enterprise network.

In some examples, the RAG component may generate and/or send a query to a model component of the network controller that instructs the model component to generate synthetic test(s) based on the context data. In some examples, the RAG component may send the context data to the vulnerability engine. In this example, the vulnerability engine may generate and send the query to the model component.

In some examples, the RAG component may receive the query from the vulnerability engine in response to the vulnerability engine receiving a security threat or identifying a problem within the enterprise network. In this example, the RAG component may access and generate the context data, where the context data includes an indication of the security threat or the problem. In this example, the query to the model component (generated and sent by the RAG component or the vulnerability engine) may comprise instructions to generate synthetic test(s) that can identify whether any damage will occur to the network due to the security threat or problem, the extent of the damage, impact of the security threat to the enterprise network, etc.

In some examples, the system may comprise a model component. In some examples, the model component may be implemented as an application or cloud application separate from the network controller. In some examples, the model component may be implemented as a component of the network controller. In some examples, the model component may be included as part of a private cloud or public cloud. For instance, the model component may comprise a machine learning model, such as an LLM, a small language model (SLM), or any other suitable technique. The model component may receive context data as input, as well as instructions requesting the creation of synthetic test(s) that can be run on both (i) the network and (ii) the network controller in order to identify anomalies and/or problems within the enterprise network. The model component may generate the synthetic test(s) based on the context data, which may comprise VEX data, a state of the network, data associated with a potential vulnerability, a type associated with the potential vulnerability, a type of device or application associated with the potential vulnerability, traffic data, etc. In some examples, the model component may create multiple synthetic test(s) in response to a single query and/or to test a single potential vulnerability.

In some examples, the model component may output the synthetic test(s) to the vulnerability engine. The vulnerability engine may execute the synthetic test(s) within the network and/or on the network controller. The synthetic test(s) may provide score(s) as output. The vulnerability engine may determine, based on the score(s) whether there may be a problem within the network and/or that a potential vulnerability will have an impact on the network and/or the network controller. For instance, the vulnerability engine may determine that a first score of a first synthetic test run within the network is greater than a threshold score. By exceeding the threshold score, the vulnerability engine may determine that a security threat is likely to have a negative impact on the network and one or more policy(ies) are needed. The vulnerability engine may send instructions to a policy component of the network controller to determine and/or create the policy(ies). In some examples, the vulnerability engine may be configured to determine and/or create the policy(ies).

In some examples, the system may comprise a policy component. In some examples, the policy component may be included as part of the vulnerability engine. In some examples, the policy component may be configured to determine, based on the scores output by synthetic tests and/or instructions received from the vulnerability engine, multi-faceted policy(ies) to apply in order to mitigate a vulnerability, security threat, etc. For instance, the policy component may determine and/or generate policy(ies) for the network and/or the network controller. The policy component may output the policy(ies) to the vulnerability engine, such that the network controller can apply and/or enforce the policy(ies).

In some examples, the policy component may determine, based on the output of the synthetic test(s), one or more network policy(ies) to apply. Network policy(ies) may include policies to be applied on the network devices that can mitigate the vulnerable devices/applications based on the VEX to be accessed or invoking other parts, limiting the traffic, by-passing any sensitive traffics etc.

In some examples, the policy component may be configured to generate and/or modify network controller policy(ies). The network controller policy(ies) may correspond to operational policies implemented by the network controller itself. In some examples, the network controller policies may include: (i) network provisioning policy(ies) (e.g., if a synthetic test is related a vulnerable path and the output of the synthetic test indicates the path is vulnerable, the network controller may create or update a network controller policy such that the network controller avoids applying any network configuration changes, updates, etc. on the devices in the vulnerable path until the problem is mitigated. The network controller policy can override the existing role-based access controls (RBACs) and/or any configuration changes applied by the network administrator); (ii) telemetry handling policy (e.g., the network controller can update and/or create a policy to avoid processing any telemetry data received from suspect devices or applications until the suspected devices or applications pass the synthetic tests); (iii) site wide policy (e.g., the network controller may apply a certain action to mitigate the problem to specific sites managed by the controller, specific vulnerable sites, a specific class of devices, etc.).

In this way, the system may provide the intelligent and customized creation of network controller policies and network policies that can mitigate and remediate vulnerabilities and reduce false positives. By implementing the vulnerability component as part of the network controller, the techniques described herein may enable the network controller to perform functions previously not performed by the network controller and create a new VEX inventory that is stored in a knowledge base of the network controller. Further, by implementing a RAG component as part of the network controller and utilizing data accessible to the network controller in addition to the VEX data when generating context data, the techniques described herein can generate customized synthetic tests that can be executed on the network as well as the network controller to determine an impact of a potential vulnerability. Thus, in contrast to existing techniques, the techniques described herein enable mitigation when a potential vulnerability will have a negative impact on the network. Thus, policies that are created or modified can be sent to particular device(s) impacted by the potential vulnerability, instead of all network devices, thereby reducing the rate of false positives. Moreover, the techniques described herein enable policies to be created or modified that mitigate potential vulnerabilities both within the network and at the network controller itself. That is, unlike existing techniques, which focus on identifying network policies, the techniques described herein can further change the operational behavior of the network controller.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can generate multi-faceted policies using SBOM and VEX data intelligence. While the system 100 shows an example network controller 104, it is understood that any of the components of the system may be implemented on any device in the network 102. Moreover, while the system 100 shows the example network controller 104 as being included as part of the network 102, it is understood that the network controller 104 and/or any of the components of the system may be implemented as part of an on-premise solution. For instance, the network controller 104 may be included as part of a software package that is configured to be deployed within an environment of a user, such as a customer.

In some examples, the system 100 may include a network 102 that includes network devices 106. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), RA VPNs, VPNs, ZTNA, Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers. In some examples, the network 102 comprises a cloud network and/or an enterprise network. In some examples, the network device(s) 106 may comprise router(s), switche(s), server(s), or any other computing device.

The system 100 may comprise a network controller 104. In some examples, the network controller 104 corresponds to a system that has complete visibility into the fabric of a given network (e.g., enterprise network, smaller network, etc.). In some examples, the network controller 104 may comprise a network orchestrator, one or more processors, etc.

As illustrated the network controller 104 may comprise a vulnerability engine 110, an inventory component 112, a RAG component 114, and/or a policy component 118.

As described in greater detail below, the vulnerability engine 110 is configured to receive SBOMs, extract VEX data, process the VEX data according to multiple standards, create a VEX inventory, generate vulnerability insights, store and/or retrieve data and/or VEX data, receive incident reports and/or security threat messages, query for context data generation, analyze the context data, query for synthetic test generation, execute the synthetic test(s), determine policy(ies) and/or create policy(ies) based on the output(s) of the synthetic test(s) and/or query for the policy(ies), and enforce the policy(ies). In some examples, the vulnerability engine may comprise one or more processors, memory, etc.

As described in greater detail below, the inventory component 112 is configured to capture and/or store information and/or be implemented as a knowledge base of the network controller 104. In some examples, the inventory component 112 may include the VEX inventory created by the vulnerability engine 110 for software. In some examples, the inventory component 112 may store a plurality of VEX data associated with a plurality of different SBOMs within the VEX inventory. In some examples, the inventory component 112 may additionally or alternatively comprise data 124 captured by the network controller. For instance, the data 124 may include device inventory data, telemetry data, incident data, processed data, provision failure history, log data, configuration(s) of devices within the network, data exported from applications, user data associated with user(s) accessing device(s) or application(s), etc. associated with network devices, applications, and/or any other devices associated with the network. Accordingly, the inventory component 112 may store and collect VEX inventory data, as well as other data, that is organized and indexed for efficient retrieval. The inventory component 112 may collect data 124 received from network device(s), site(s) 108, application(s), etc. within the network. In some examples, the inventory component 112 may be updated in real-time.

As described in greater detail below, the RAG component 114 is configured to access the VEX data, VEX inventory, and data stored in the inventory component. The RAG component may process the VEX data, VEX inventory, and/or data and generate context data. For instance, the context data may be based on a state of the enterprise network and/or the vulnerability insights. In some examples, the RAG component may queries the retrieve the operation history, logs, events, telemetry insights, failed information, etc., associated with the network that is stored in the inventory component. The RAG component may use this data to generate rich context data that comprises sufficient background to enable a model component of the network controller to generate customized synthetic test(s).

As described in greater detail below, the policy component 118 is configured to determine, based on the scores output by synthetic tests and/or instructions received from the vulnerability engine, multi-faceted policy(ies) to apply in order to mitigate a vulnerability, security threat, etc. For instance, the policy component may determine and/or generate policy(ies) for the network and/or the network controller. The policy component may output the policy(ies) to the vulnerability engine, such that the network controller can apply and/or enforce the policy(ies).

In some examples, the network controller may send policy data 132 to the site(s) 108 and/or network device(s) 106. Policy data 132 may comprise instructions and/or network policies to apply in order to mitigate a vulnerability, impact of a potential vulnerability, etc.

The network controller may be configured to communicate with a model component 116. As illustrated, the network controller 104 may send context data 128 to the model component 116. Context data 128 may comprise VEX data, a state of the network, data associated with a potential vulnerability, a type associated with the potential vulnerability, a type of device or application associated with the potential vulnerability, traffic data, etc.

As described in greater detail below, the model component 116 may be configured to receive context data 128 as input and generate synthetic test(s) 130 as output. the model component 116 may comprise a machine learning model, such as an LLM, a small language model (SLM), or any other suitable machine learning technique. The model component may receive the context data 128 as input, as well as instructions requesting the creation of synthetic test(s) 130 that can be run on one or more of (i) the network and (ii) the network controller in order to identify anomalies and/or problems within the network and/or determine an impact a potential vulnerability may have on the network. The model component 116 may be configured to generate and output synthetic test(s) 130. As noted above, in some examples, the model component 116 may be implemented as part of the network controller.

In some examples, the system 100 comprises site(s) 108 that are configured to communicate with the network 102, the network controller 104, etc. In some examples, the site(s) 108 comprise one or more server(s), enterprise network(s), and/or service(s) associated with a service provider, one or more network device(s), etc. In some examples, the site(s) 108 correspond to one or more data center(s) comprising various network components, such as, for example, network switch(es) (also referred to as node(s)) operating on physical servers. In some examples, the site(s) 108 may comprise physical server(s) that may host one or more virtual machines. Each virtual machine may be configured to execute one of various operations and act as one or more virtual components for the cloud network(s) and/or enterprise/application network. In some examples, the physical server(s) may host any number of virtual machines. In some examples, the physical server(s) in the enterprise/application network may host the various network components of the enterprise/application network.

In some examples, the network controller 104 may be configured to communicate with administrator device(s) 120. As illustrated, the administrator device(s) 120 may comprise an application 122. In some examples, the application 122 may correspond to an application provided by a service provider (e.g., such as Cisco) that enables an administrator of the network 102 to access the network controller 104. In some examples, the network controller 104 may be configured to receive software data 126 from the administrator device(s) 120. In some examples, the software data 126 may comprise software associated with an application, product, update, etc. to be deployed within the network 102.

At "1", the system may receive software data. For instance, the system may receive software data 126. The software data 126 may comprise SBOM data associated with software being deployed within the network.

At "2", the system may generate and store vulnerability insights. For instance, the system may extract VEX data using the vulnerability engine 110 and create VEX inventory within the inventory component 112. The system may generate vulnerability insights using the vulnerability engine 110.

At "3", the system may generate context data. For instance, the system may generate context data 128 using the RAG component 114.

At "4", the system may generate and execute synthetic test(s). For instance, the system may generate synthetic test(s) 130 using model component 116. The system may execute the synthetic test(s) 130 within the network 102 and/or on the network controller 104 using the vulnerability engine 110.

At "5", the system may determine and/or generate policy(ies) including network policy(ies) and/or network controller policy(ies). For instance, the system may determine the policy(ies) based on score(s) output by the synthetic test(s). The system may determine and/or generate the policy(ies) using the vulnerability engine 110 and/or policy component 118.

At "6", the system may enforce the policy(ies). For instance, the system may send policy data 132 comprising the network policy(ies) for application within the network 102. The system may apply the network controller policy (ies) to the network controller 104 itself, such that operational behavior of the network controller 104 can be changed or updated.

In this way, the system may provide the intelligent and customized creation of network controller policies and network policies that can mitigate and remediate vulnerabilities and reduce false positives. By implementing the vulnerability component as part of the network controller, the techniques described herein may enable the network controller to perform functions previously not performed by the network controller and create a new VEX inventory that is stored in a knowledge base of the network controller. Further, by implementing a RAG component as part of the network controller and utilizing data accessible to the network controller in addition to the VEX data when generating context data, the techniques described herein can generate customized synthetic tests that can be executed on the network as well as the network controller to determine an impact of a potential vulnerability. Thus, in contrast to existing techniques, the techniques described herein enable mitigation when a potential vulnerability will have a negative impact on the network. Thus, policies that are created or modified can be sent to particular device(s) impacted by the potential vulnerability, instead of all network devices, thereby reducing the rate of false positives. Moreover, the techniques described herein enable policies to be created or modified that mitigate potential vulnerabilities both within the network and at the network controller itself. That is, unlike existing techniques, which focus on identifying network policies, the techniques described herein can further change the operational behavior of the network controller.

FIG. 2 illustrates a component diagram 200 of an example controller described in FIG. 1. In some instances, one or more of the components of the network controller 104 may run on one or more computing devices in, or associated with, the network 102 (e.g., a single device or a system of devices). In some instances, the network controller 104 may be integrated as part of an enterprise network.

Generally, the network controller 104 may include a programmable controller that manages some or all of the controller activities of the network 102, and manages or monitors the network state using one or more centralized control models.

As illustrated, the network controller 104 may include, or run on, one or more hardware processors 202 (processors), one or more devices, configured to execute one or more stored instructions. The processor(s) 202 may comprise one or more cores. Further, the network controller 104 may include or be associated with (e.g., communicatively coupled to) one or more network interfaces 204 configured to provide communications with network device(s), the edge device(s), and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The network controller 104 may also include memory 206, such as computer-readable media, that stores various executable components (e.g., software-based components, firmware-based components, etc.). The memory 206 may generally store components to implement functionality described herein as being performed by the network controller 104. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the network controller 104.

The network controller 104 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various controller functions to occur.

In some examples, the network controller 104 may include a vulnerability engine 110. In some examples, the vulnerability engine 110 may be configured to receive SBOMs associated with software being deployed within the enterprise network. In some examples, the vulnerability engine may comprise one or more parsers for VEX. For instance, the vulnerability engine may be designed to support a first parser based on the CycloneDX standard and a second parser based on the SPDX standard. Accordingly, the vulnerability engine may be configured to process the SBOM and/or VEX data based on the two different standards. For instance, the vulnerability engine may be designed to extract VEX data from SBOMs associated with underlying devices or applications. The vulnerability engine may generate, based on parsing the VEX data, vulnerability insights in terms of which components of the enterprise network are vulnerable, where these are these hosted etc. As an example, the vulnerability insights may identify a specific component within the network that is associated with a particular vulnerability identified in the VEX data of the software, as well as where in the enterprise network the component is located, what class of device the component is hosted on, etc. Accordingly, the vulnerability engine may process the VEX data based on two different standards. In some examples, the vulnerability engine may create an inventory (e.g., stored in the inventory component), which may be stored in memory of the network controller and/or a database of the network controller. In some examples, the vulnerability engine may be configured to communicate with one or more additional components of the network controller.

In some examples, the vulnerability engine 110 is configured to receive SBOMs, extract VEX data, process the VEX data according to multiple standards, create a VEX inventory, generate vulnerability insights, store and/or retrieve data and/or VEX data, receive incident reports and/or security threat messages, query for context data generation, analyze the context data, query for synthetic test generation, execute the synthetic test(s), determine policy(ies) and/or create policy(ies) based on the output(s) of the synthetic test(s) and/or query for the policy(ies), and enforce the policy(ies). In some examples, the vulnerability engine may comprise one or more processors, memory, etc.

The network controller 104 may include an inventory component 112. In some examples, the inventory component 112 may correspond to a knowledge base of the network controller. In some examples, the inventory component may comprise an inventory created by the vulnerability engine. In some examples, the inventory component may additionally or alternatively comprise data captured by the network controller. For instance, the data may include device inventory data, telemetry data, incident data, processed data, provision failure history, log data, configuration of devices within the enterprise network, data exported from applications, user data associated with user(s) accessing device(s) or application(s), etc. associated with network devices, applications, and/or any other devices associated with the enterprise network. Accordingly, the inventory component may store VEX inventory data, as well as other data, that is organized and indexed for efficient retrieval.

The network controller 104 may include a RAG component 114. As noted above, RAG is an architectural approach used to create augmented context, which can be input to a model. However, existing techniques do not provide a mechanism to implement RAG within a network controller. In some examples, the RAG component 114 may be configured to retrieve the VEX data, VEX inventory, and data stored in the inventory component. The RAG component may process the VEX data, VEX inventory, and/or data and generate context data. For instance, the context data may be based on a state of the enterprise network and/or the vulnerability insights. In some examples, the RAG component may query the inventory component to retrieve the operation history, logs, events, telemetry insights, failed information, etc., associated with the network for use in generating the context data. The RAG component may use this data to generate rich context data that comprises sufficient background to enable a model component of the network controller to generate customized synthetic test(s).

In some examples, the RAG component 114 may generate the context data in response to receiving a query from the vulnerability engine 110. For instance, the query may be sent by the vulnerability engine periodically (e.g., every hour, day, week, or any other suitable time period). The time period may be preset by a network administrator. In some examples, the RAG component may access and/or collect data from the inventory component and generate the context data. In some examples, the context data may indicate a current state of the enterprise network and/or a potential vulnerability within the enterprise network.

In some examples, the RAG component 114 may generate and/or send a query to a model component of the network controller that instructs the model component to generate synthetic test(s) based on the context data. In some examples, the RAG component may send the context data to the vulnerability engine. In this example, the vulnerability engine may generate and send the query to the model component.

In some examples, the RAG component 114 may receive the query from the vulnerability engine in response to the vulnerability engine receiving a security threat or identifying a problem within the enterprise network. For instance, the RAG component may access and generate the context data, where the context data includes an indication of the security threat or the problem. In this example, the query to the model component (generated and sent by the RAG component or the vulnerability engine) may comprise instructions to generate synthetic test(s) that can identify whether any damage will occur to the network due to the security threat or problem, the extent of the damage, impact of the security threat to the enterprise network, etc.

The network controller 104 may include a model component 116. the model component may comprise a machine learning model, such as an LLM, a small language model (SLM), or any other suitable technique. The model component may receive context data as input, as well as instructions requesting the creation of synthetic test(s) that can be run on both (i) the network and (ii) the network controller in order to identify anomalies and/or problems within the enterprise network. The model component may generate the synthetic test(s) based on the context data, which may comprise VEX data, a state of the network, data associated with a potential vulnerability, a type associated with the potential vulnerability, a type of device or application associated with the potential vulnerability, traffic data, etc. In some examples, the model component may create multiple synthetic test(s) in response to a single query and/or to test a single potential vulnerability.

Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

In some examples, the model component 116 may output the synthetic test(s) to the vulnerability engine 110. The vulnerability engine 110 may execute the synthetic test(s) within the network and/or on the network controller. The synthetic test(s) may provide score(s) as output. The vulnerability engine 110 may determine, based on the score(s) whether there may be a problem within the network and/or that a potential vulnerability will have an impact on the network and/or the network controller 104. For instance, the vulnerability engine may determine that a first score of a first synthetic test run within the network is greater than a threshold score. By exceeding the threshold score, the vulnerability engine may determine that a security threat is likely to have a negative impact on the network and one or more policy(ies) are needed. The vulnerability engine may send instructions to a policy component of the network controller to determine and/or create the policy(ies). In some examples, the vulnerability engine 110 may be configured to determine and/or create the policy(ies).

In some examples, the network controller 104 may include a policy component 118. In some examples, the policy component may be included as part of the vulnerability engine. In some examples, the policy component may be configured to determine, based on the scores output by synthetic tests and/or instructions received from the vulnerability engine, multi-faceted policy(ies) to apply in order to mitigate a vulnerability, security threat, etc. For instance, the policy component may determine and/or generate policy(ies) for the network and/or the network controller. The policy component may output the policy(ies) to the vulnerability engine, such that the network controller can apply and/or enforce the policy(ies).

In some examples, the policy component may determine, based on the output of the synthetic test(s), one or more network policy(ies) to apply. Network policy(ies) may include policies to be applied on the network devices that can mitigate the vulnerable devices/applications based on the VEX to be accessed or invoking other parts, limiting the traffic, by-passing any sensitive traffics etc.

In some examples, the policy component may be configured to generate and/or modify network controller policy(ies). The network controller policy(ies) may correspond to operational policies implemented by the network controller itself. In some examples, the network controller policies may include: (i) network provisioning policy(ies) (e.g., if a synthetic test is related a vulnerable path and the output of the synthetic test indicates the path is vulnerable, the network controller may create or update a network controller policy such that the network controller avoids applying any network configuration changes, updates, etc. on the devices in the vulnerable path until the problem is mitigated. The network controller policy can override the existing RBAC and/or any configuration changes applied by the network administrator); (ii) telemetry handling policy (e.g., the network controller can update and/or create a policy to avoid processing any telemetry data received from suspect devices or applications until the suspected devices or applications pass the synthetic tests); (iii) site wide policy (e.g., the network controller may apply a certain action to mitigate the problem to specific sites managed by the controller, specific vulnerable sites, a specific class of devices, etc.).

As an example, and not by way of limitation, the vulnerability engine 110 may receive a message from an application within the network that indicates a setting is being used improperly and/or may be exploited. The vulnerability engine 110 may send a request to the RAG component 114 that indicates the application, the setting, etc. The RAG component may retrieve data from the inventory component and generate context data. In this example, the context data may indicate whether the setting is associated with a vulnerability identified in the VEX inventory, a current state of the network, device(s) in the network that the application is being hosted on, a type of vulnerability the setting is associated with, component(s) and/or device(s) of the network the type of vulnerability associated with the setting can expose, etc. The vulnerability engine 110 may send the context data and instructions to the model component 116. The instructions may include a request to generate particular synthetic test(s) based on various features of the context data (e.g., such as the type of vulnerability), the current network state, etc., such that an impact of the vulnerability associated with the setting can be determined. For instance, the instruction(s) may request the generation of synthetic test(s) that can test the type(s) of traffic sent by the application and/or using the setting, destination(s) of the traffic, or any other feature or aspect of the network. The vulnerability engine 110 may execute the synthetic test(s) (e.g., within the network and/or on the network controller) and may receive the score(s) output. Based on the scores, the vulnerability engine 110 may determine that there is a problem within the network, such that a network policy needs to be created and/or modified to perform a remedial and/or mitigating action. Example network policies can include blocking data from a particular application, sending data through a firewall, etc. Additionally or alternatively, the vulnerability engine 110 may determine that a network controller policy needs to be created or modified in order to mitigate or remediate the impact of the vulnerability. For instance, the network controller policy may block configuration changes for a certain period of time, identify a potentially vulnerable site or class of devices within the network and block processing of telemetry data from the potentially vulnerable site or class of device or prevent the resto the network from communicating with the potentially vulnerable site, etc.

The network controller 104 may further include a data store 216, such as long-term storage, that stores communication libraries 218 for the different communication protocols that the network controller 104 is configured to use or perform. Additionally, the data store 216 may include network topology data 220, such as a model representing the layout of the network components in the network 102 and/or data indicating available bandwidth, available CPU, delay between nodes, computing capacity, processor architecture, processor type(s), etc. The data store 216 may store policies 222 that include, but are not limited to, network policy(ies), network controller policy(ies), security data associated with the network, security policies configured for the network, firewall policies, firewall configuration data, network configuration policies, network configuration data, security posture data, and/or compliance policies configured for the network. The data store 216 may store data 224 including metadata, SBOMs, VEX inventory, VEX data, context data, telemetry data, device inventory data, incident data, processed data, provision failure history, log data, configuration of devices within the enterprise network, data exported from applications, user data associated with user(s) accessing device(s) or application(s) network data, or any other data and/or information described herein.

Figure 3A:
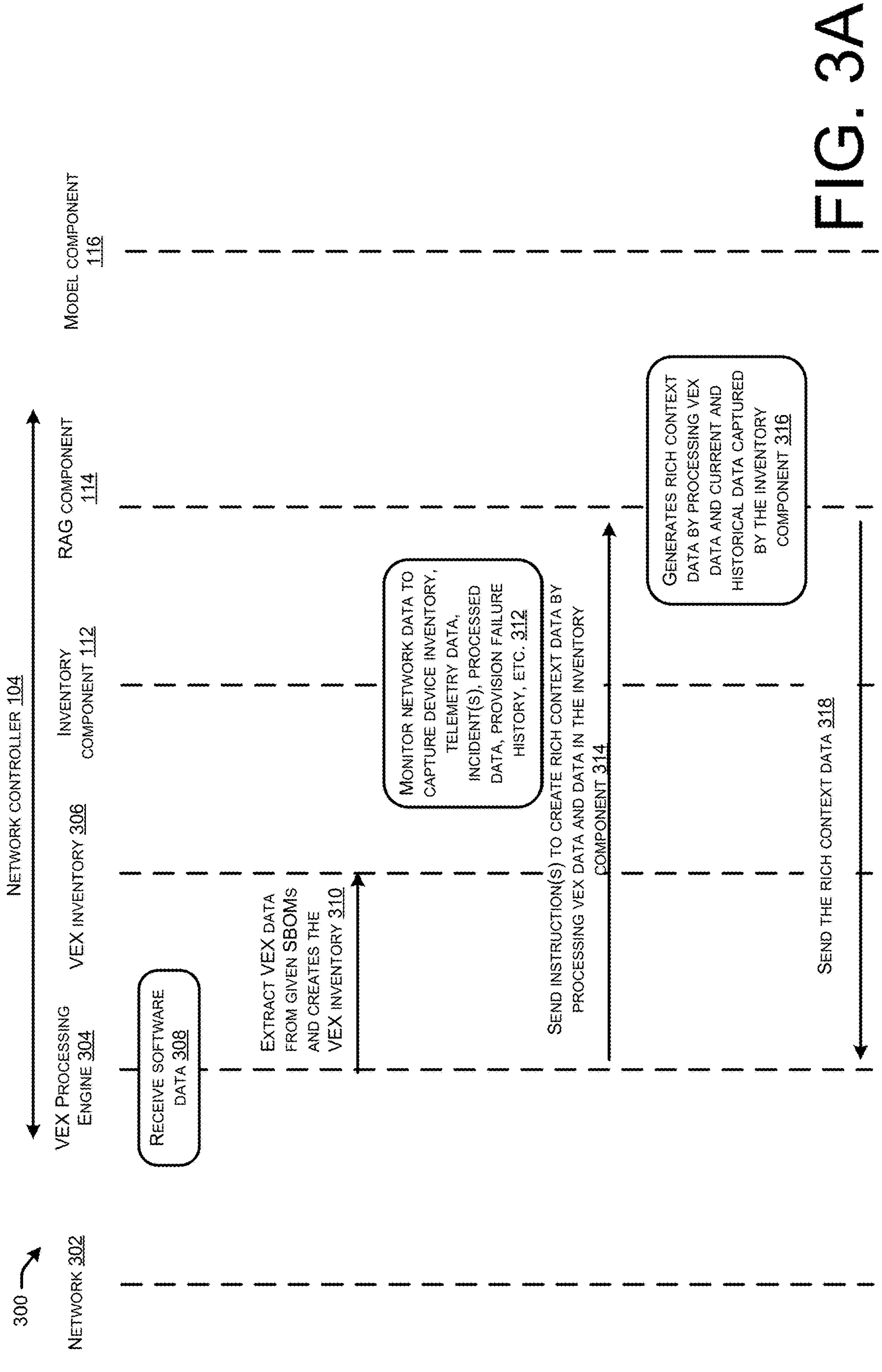
FIGS. 3A and 3B illustrate a flow diagram of example communications corresponding to a network controller generating customized and intelligent multi-faceted policies.
Figure 3B:
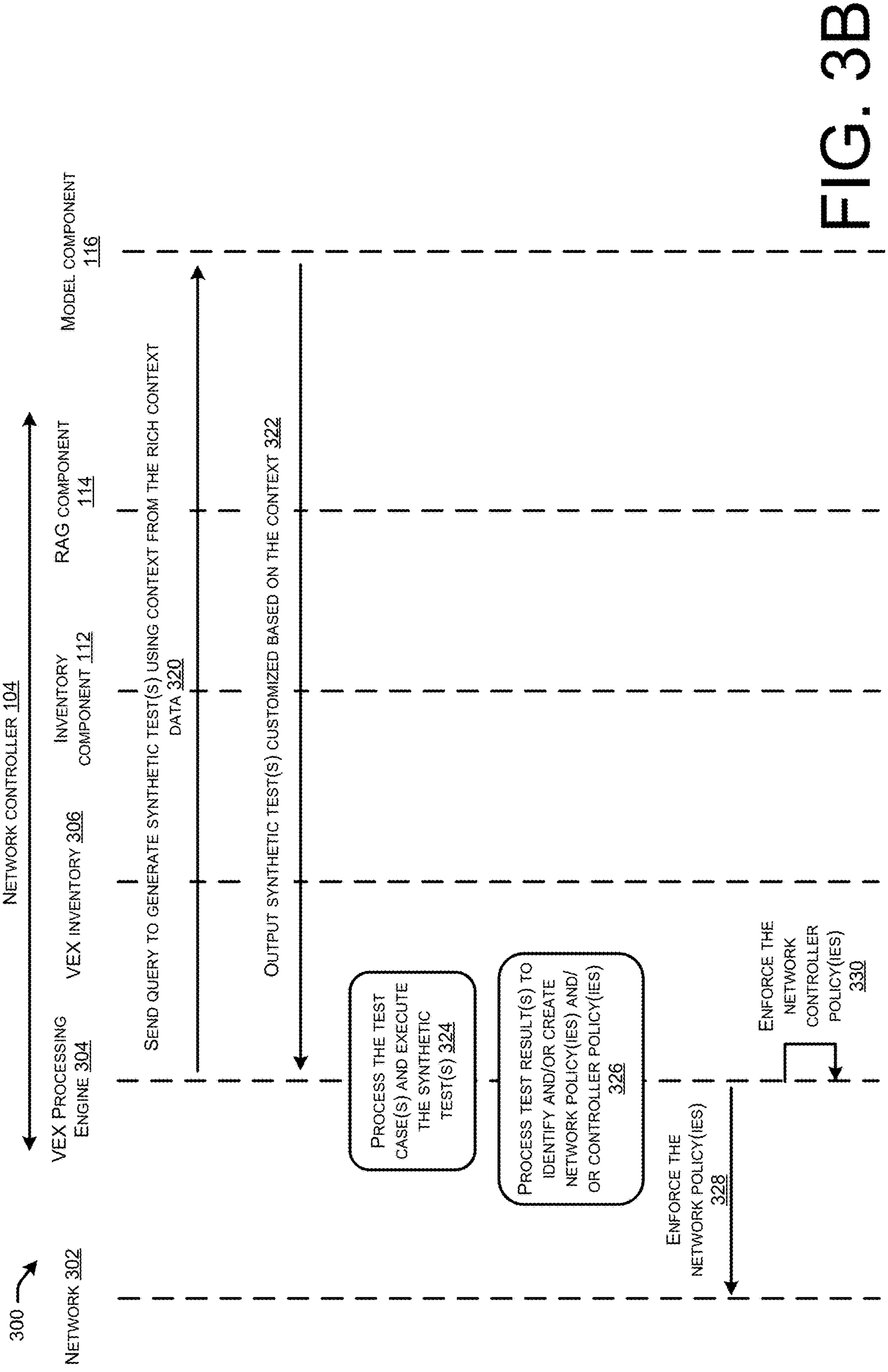

FIGS. 3A and 3B illustrate a flow diagram of example communications 300 between components of a network controller 104 and a network 302 to generate policy(ies). As illustrated, the network controller 104 may include a VEX processing engine 304, VEX inventory 306, an inventory component 112, and a RAG component 114. The VEX processing engine 304 may correspond to the vulnerability engine 110 described herein. In the illustrated example, VEX inventory 306 is separate from the inventory component 112, however, it is understood that the VEX inventory 306 may be created and/or stored within the inventory component 112. Additionally, the illustrated example includes model component 116 as being separate from the network controller 104, however it is understood that, in some examples, the model component 116 may be implemented as part of the network controller. Moreover, in the illustrated example, the policy component 118 is integrated as part of the VEX processing engine 304. Network 302 may correspond to network 102 described herein. In the illustrated example, the network 302 may represent network device(s) 106, site(s) 108, administrator device(s) 120, and/or any other actor within the network 102.

As illustrated in FIG. 3A, at 308, the VEX processing engine 304 may receive software data. In some examples, software data comprises software data 126. Software data may be received from the network 302.

At 310, the VEX processing engine 304 extracts the VEX data from the SBOMs included in the software data and creates VEX inventory 306. The VEX processing engine 304 may parse the VEX data to generate vulnerability insights that indicate which components within the network 302 are vulnerable, where the components are hosted, etc. The VEX processing engine may support parsers for VEX, which can be based on standards including CycloneDX and SPDX. Accordingly, the VEX processing engine can process the VEX data according to multiple standards in order to generate vulnerability insights. In some examples, the VEX processing engine 304 sends the VEX data and vulnerability insights to the VEX inventory, such that the VEX data and vulnerability insights are organized and indexed for efficient retrieval.

At 312, the inventory component 112 may monitor network data and may capture and store data within a knowledge base (e.g., memory of the network controller and/or datastore of the network controller). The data may include, but is not limited to device inventory data, telemetry data, incident(s), processed data, provision failure history(ies), etc.

At 314, the VEX processing engine 304 may send instruction(s) to the RAG component 114 to create rich context data by processing the VEX data and the data in the knowledge base (e.g., the inventory component 112). As noted above, the VEX processing engine may send the instructions periodically and/or on an as needed basis (e.g., such as in response to receiving a message indicating a security threat, potential vulnerability, etc.).

At 316, the RAG component 114 generates the rich context data by processing VEX data and current and historical data captured by the inventory component. For instance, the RAG component 114 accesses the VEX inventory 306 and data from the inventory component to generate the rich context data. In some examples, the rich context data corresponds to context data 128.

At 318, the RAG component 114 sends the generated rich context data to the VEX processing engine.

At 320, the VEX processing engine 304 may send a query to the model component 116 to generate synthetic test(s) using context from the rich context data. For instance, the VEX processing engine 304 may determine a current state of the network 302, type of vulnerability, and one or more aspect(s) of the network and/or network controller 104 to test using the synthetic test(s). The query may include instructions associated with the generation of the synthetic test(s), the rich context data, context, etc.

At 322, the model component 116 may output the synthetic test(s) to the VEX processing engine 304. The synthetic test(s) may be customized based on the context and/or information included in the query.

At 324, the VEX processing engine 304 processes the test case(s) and execute(s) the synthetic test(s). For instance, the VEX processing engine 304 may identify which synthetic test(s) to execute at the network controller and which synthetic test(s) to execute within the network 302. The VEX processing engine may execute the synthetic test(s) and receive score(s) as output(s).

At 326, the VEX processing engine 304 may process the test result(s) to identify and/or create network policy(ies) and/or network controller policy(ies). For instance, processing the test result(s) can include determining whether the score(s) indicate a negative or harmful impact to the network, determining, what traffic may be impacted, components of the network may be impacted, etc. As noted above, the VEX processing engine 304 may identify, modify, and/or create multi-faceted policies for the network (e.g., network policies) and/or the network controller (e.g., network controller policies).

At 328, the VEX processing engine 304 enforces the network policy(ies) and sends the network policy(ies) to the network 302.

At 330, the VEX processing engine 304 enforces the network controller policy(ies) at the network controller 104, such that operational behavior of the network controller 104 is updated based on the network controller policy(ies).

Figure 4:
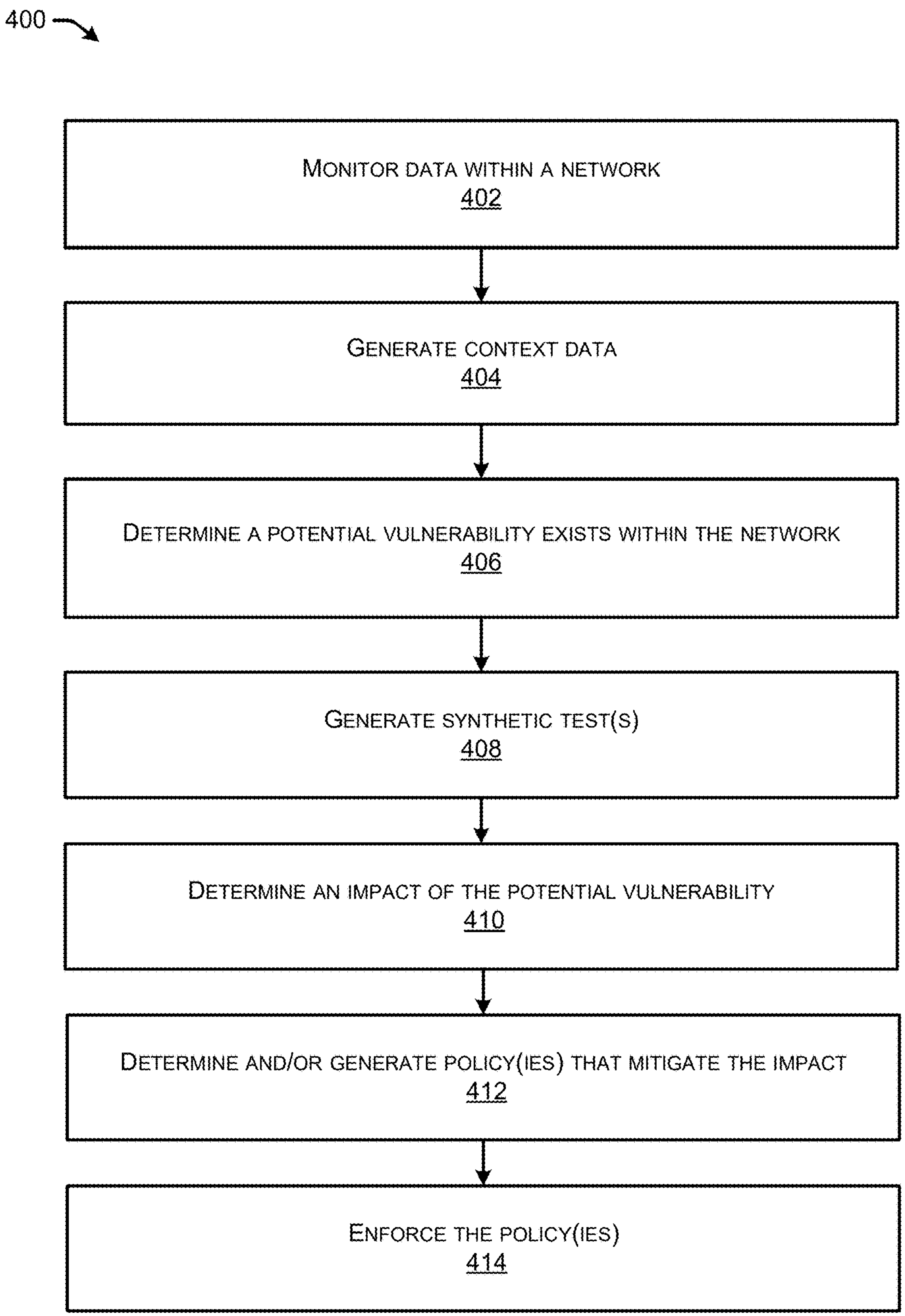
FIG. 4 illustrates a flow diagram of an example method for generating customized and intelligent multi-faceted policies.

FIG. 4 illustrates a flow diagram of an example system 400 for generating customized and intelligent multi-faceted policies according to the techniques described in FIGS. 1-3B. In some instances, the steps of system 400 may be performed by one or more devices (e.g., network controller 104, etc.) that include one or more processors and one or more non-transitory computer-readable media storing computer-executable instructions that, when executed by the one or more processors, cause the one or more processors to perform operations of system 400.

At 402, the system may monitor data within a network. In some examples, the data may be associated with a plurality of devices within the network. The network may correspond to an enterprise network. The system may collect and store the data in a datastore of a network controller, such as inventory component 112. In some examples, the data includes telemetry data associated with devices within the network, configuration data of the devices, user data associated with users accessing the network, VEX data, inventory data, export data associated with applications, and log data.

In some examples, the system may receive software data associated with software being deployed within the network, the software data including a software bill of materials (SBOM). The system may extract, based on processing the software data, vulnerability exploitability exchange (VEX) data from the SBOM. The system may generate, based on the VEX data and the software data, vulnerability insights including components that are vulnerable and where the components are hosted within the network. The system may store the vulnerability insights, the SBOM, and the VEX data within a datastore of the network controller, the vulnerability insights being indexed and associated with the software. As noted above, the system may create an inventory to store one or more of the VEX data, vulnerability insights, etc.

At 404, the system may generate context data. In some examples, the system may generate the context data using a RAG component implemented as part of the network controller. In some examples, generating the context data is based at least in part on accessing the software data, the VEX data, or the vulnerability insights.

At 406, the system may determine a potential vulnerability exists within the network. In some examples, determining that the potential vulnerability exists is based on receiving a message indicating a security threat or a problem within the network. The problem may correspond to a vulnerability, such as a misused setting of an application, or a feature reported as being exploited or potentially exploited. In some examples, determining the potential vulnerability exists is based on a periodic request for the context data. The potential vulnerability may be determined based on the context data, a state of the network, etc.

At 408, the system may generate synthetic test(s). In some examples, generating the synthetic test comprises providing the context data as input to a large language model (LLM). In some examples, the synthetic test(s) are customized based on the potential vulnerability, context data, and/or information included in the query. The synthetic test(s) may output score(s) indicating an impact or likelihood of a negative impact of the potential vulnerability within the network.

At 410, the system may determine an impact of the potential vulnerability. For instance, the impact may be determined based on executing the synthetic test(s). Determining the impact may be based on whether score(s) output by executing the synthetic test(s) exceed a threshold. Determining the impact may include identifying traffic, device(s), application(s), etc. within the network that are impacted by the type of potential vulnerability.

At 412, the system may determine and/or generate policy(ies) that mitigate the impact. In some examples, generating the network controller policy associated with mitigating the impact comprises: creating, based on the impact, one or more of a network provisioning policy, telemetry handling policy, or a site wide policy as the network controller policy; and updating the network controller to apply the network controller policy, wherein the network controller policy is configured to change one or more operational behaviors of the network controller.

In some examples, the system may determine, based on the impact, a network policy to apply to one or more sites, one or more network devices, or more or more applications within the network to mitigate and/or remediate the impact; and At 414, the system may enforce the policy(ies). For instance, the system may send the network policy to the one or more sites or the one or more network devices within the network. The system may apply the network controller policy to the network controller, such that the operational behavior of the network controller changes and/or is updated.

In this way, the system may provide the intelligent and customized creation of network controller policies and network policies that can mitigate and remediate vulnerabilities and reduce false positives. By implementing the vulnerability component as part of the network controller, the techniques described herein may enable the network controller to perform functions previously not performed by the network controller and create a new VEX inventory that is stored in a knowledge base of the network controller. Further, by implementing a RAG component as part of the network controller and utilizing data accessible to the network controller in addition to the VEX data when generating context data, the techniques described herein can generate customized synthetic tests that can be executed on the network as well as the network controller to determine an impact of a potential vulnerability. Thus, in contrast to existing techniques, the techniques described herein enable mitigation when a potential vulnerability will have a negative impact on the network. Thus, policies that are created or modified can be sent to particular device(s) impacted by the potential vulnerability, instead of all network devices, thereby reducing the rate of false positives. Moreover, the techniques described herein enable policies to be created or modified that mitigate potential vulnerabilities both within the network and at the network controller itself. That is, unlike existing techniques, which focus on identifying network policies, the techniques described herein can further change the operational behavior of the network controller.

Figure 5:
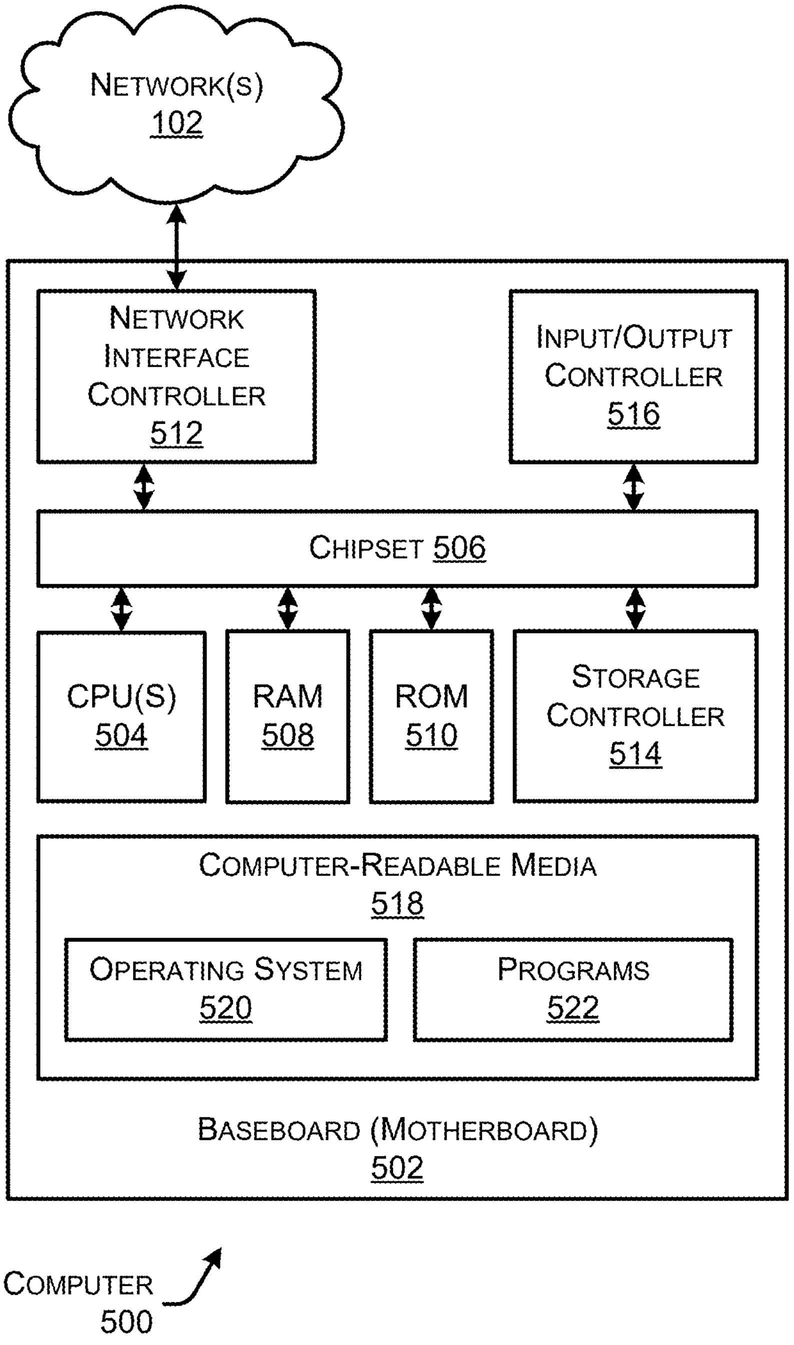
FIG. 5. is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a network controller 104 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network controller 104 and/or any components included therein, may be supported by one or more devices similar to computer 500. Stated otherwise, some or all of the operations performed by the network controller 104 and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a network controller 104 and/or any other device. The computer 500 may include one or more hardware processors (processors) configured to execute one or more stored instructions. The processor(s) may comprise one or more cores. Further, the computer 500 may include one or more network interfaces configured to provide communications between the computer 500 and other devices, such as the communications described herein as being performed by the network controller 104 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including monitoring data associated with a plurality of network devices within the network; generating, based on the monitoring, context data associated with the data; determining that a potential vulnerability exists within the network; generating, using the context data, a synthetic test to evaluate the potential vulnerability within the network; determining, based on executing the synthetic test, an impact of the potential vulnerability to the network; generating, based on the impact, a network controller policy associated with mitigating the impact; and enforcing the network controller policy.

In this way, the computer 500 can provide the intelligent and customized creation of network controller policies and network policies that can mitigate and remediate vulnerabilities and reduce false positives. By implementing the vulnerability component as part of the network controller, the techniques described herein may enable the network controller to perform functions previously not performed by the network controller and create a new VEX inventory that is stored in a knowledge base of the network controller. Further, by implementing a RAG component as part of the network controller and utilizing data accessible to the network controller in addition to the VEX data when generating context data, the techniques described herein can generate customized synthetic tests that can be executed on the network as well as the network controller to determine an impact of a potential vulnerability. Thus, in contrast to existing techniques, the techniques described herein enable mitigation when a potential vulnerability will have a negative impact on the network. Thus, policies that are created or modified can be sent to particular device(s) impacted by the potential vulnerability, instead of all network devices, thereby reducing the rate of false positives. Moreover, the techniques described herein enable policies to be created or modified that mitigate potential vulnerabilities both within the network and at the network controller itself. That is, unlike existing techniques, which focus on identifying network policies, the techniques described herein can further change the operational behavior of the network controller.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a network controller of a network, comprising:

monitoring one or more network devices within the network to determine network data;

receiving software data indicative of software deployed within the network, the software data including a software bill of materials (SBOM);

extracting vulnerability exploitability exchange (VEX) data from the SBOM;

determining, based on the software data and VEX data, a vulnerability insight indicative of a component that is potentially vulnerable within the network;

generating, based on the network data and the vulnerability insight context data indicative of insights into the network;

generating, using the context data and a machine learning model, a synthetic test to evaluate the component that is potentially vulnerable within the network;

causing the synthetic test to be executed within the network;

determining, based on executing the synthetic test, an impact of the component that is potentially vulnerable within the network;

generating, based on the impact, a network controller policy associated with mitigating the impact; and enforcing the network controller policy.

2. The method of claim 1, wherein determining the vulnerability insight is based on receiving a message indicating a security threat or a problem within the network.

3. The method of claim 1, wherein the network data includes at least one of telemetry data associated with the one or more network devices within the network, configuration data of the one or more network devices, user data associated with users accessing the network, inventory data, export data associated with applications, or log data.

4. The method of claim 1, wherein generating the context data comprises using a retrieval augmented generation (RAG) component of the network controller.

5. The method of claim 1, wherein the machine learning model is a large language model (LLM).

6. The method of claim 1, wherein generating the network controller policy associated with mitigating the impact comprises:

creating, based on the impact, one or more of a network provisioning policy, telemetry handling policy, or a site wide policy as the network controller policy; and updating the network controller to apply the network controller policy, wherein the network controller policy is configured to change one or more operational behaviors of the network controller.

7. The method of claim 1, further comprising:

determining, based on the impact, a network policy to apply to one or more sites, the one or more network devices, or more or more applications within the network to mitigate the impact; and sending the network policy to the one or more sites or the one or more network devices within the network.

8. The method of claim 1, wherein the synthetic test is customized outputs a score indicating the impact of the component that is potentially vulnerable within the network.

9. A system comprising:

one or more processors; and one or more computer-readable media storing instructions that, when executed by the one or more processors, cause the one or more processors to perform operations comprising:

monitoring, by a network controller, network data associated with a plurality of network devices within a network;

receiving software data indicative of software deployed within the network;

determining, based on the software data, a vulnerability insight indicative of a component that is potentially vulnerable within the network;

generating, by the network controller and based on the network data and the vulnerability insight, context data indicative of insights into the network;

generating, by the network controller and using the context data and a machine learning model, a synthetic test to evaluate the component that is potentially vulnerable within the network;

determining, by the network controller and based on executing the synthetic test, an impact of the component that is potentially vulnerable within the network;

generating, by the network controller and based on the impact, a network controller policy associated with mitigating the impact; and enforcing, by the network controller, the network controller policy.

10. The system of claim 9, the operations further comprising:

extracting, based on processing the software data, vulnerability exploitability exchange (VEX) data from the software data; and storing data regarding the vulnerability insight and the VEX data within a datastore of the network controller, the data regarding the vulnerability insight being indexed and associated with the software.

11. The system of claim 10, wherein generating the context data is based at least in part on the VEX data.

12. The system of claim 9, wherein determining the vulnerability insight is based on receiving a message indicating a security threat or a problem within the network.

13. The system of claim 9, wherein the network data includes at least one of telemetry data associated with the plurality of network devices within the network, configuration data of the plurality of network devices, user data associated with users accessing the network, VEX data, inventory data, export data associated with applications, or log data.

14. The system of claim 9, wherein generating the context data comprises using a retrieval augmented generation (RAG) component of the network controller.

15. The system of claim 9, wherein generating the synthetic test comprises providing the context data as input to a large language model (LLM).

16. The system of claim 9, wherein the synthetic test is customized and outputs a score indicating the impact of the component that is potentially vulnerable within the network.

17. The system of claim 9, the operations further comprising:

determining, based on the impact, a network policy to apply to one or more sites, one or more network devices, or more or more applications within the network to mitigate the impact; and sending the network policy to the one or more sites or the one or more network devices within the network.

18. One or more non-transitory computer-readable media maintaining instructions that, when executed by one or more processors of a network controller of a network, program the one or more processors to perform operations comprising:

monitoring network data associated with a plurality of network devices within the network;

receiving software data indicative of software deployed within the network;

determining, based on the software data, a vulnerability insight indicative of a component that is potentially vulnerable within the network;

generating, based on the network data and the vulnerability insight context data indicative of insights into the network;

generating, using the context data and a machine learning model, a synthetic test to evaluate the component that is potentially vulnerable within the network;

determining, based on executing the synthetic test, an impact of the component that is potentially vulnerable within the network;

generating, based on the impact, a network controller policy associated with mitigating the impact; and enforcing the network controller policy.

19. The one or more non-transitory computer-readable media of claim 18, wherein the operations further comprise:

extracting vulnerability exploitability exchange (VEX) data from the software data;

wherein determining the vulnerability insight is based on the VEX data.

20. The one or more non-transitory computer-readable media of claim 18, wherein generating the context data comprises using a retrieval augmented generation (RAG) component of the network controller.

* * * * *